United States Patent [19]

Ohta et al.

[11] 4,433,023

[45] Feb. 21, 1984

[54] PANEL FOR ELEVATOR

[75] Inventors: Kazutoshi Ohta; Kunio Sakakibara, both of Inazawa, Japan

[73] Assignee: Mitsubishi Denki Kabushiki Kaisha, Tokyo, Japan

[21] Appl. No.: 492,158

[22] Filed: May 11, 1983

Related U.S. Application Data

[63] Continuation of Ser. No. 337,507, Jan. 6, 1982, abandoned.

[30] Foreign Application Priority Data

Jan. 22, 1981 [JP] Japan .............................. 56-7830[U]

[51] Int. Cl.$^{3}$ .......................... B32B 7/14; B32B 3/28

[52] U.S. Cl. .................................... 428/182; 428/198; 428/194; 428/217; 181/290

[58] Field of Search ............... 428/192, 194, 182, 198, 428/217; 181/290

[56] References Cited

U.S. PATENT DOCUMENTS

| | | | |
|---|---|---|---|
| 1,492,588 | 5/1924 | Utzman | 428/192 |
| 2,981,361 | 4/1961 | Schofield | 181/290 |
| 3,669,821 | 6/1972 | Sharp | 428/197 |
| 3,674,625 | 7/1972 | Oberst et al. | 181/290 |
| 3,956,563 | 5/1976 | Spang et al. | 181/290 |
| 4,308,308 | 12/1981 | Sachse | 181/290 |

*Primary Examiner*—Alexander S. Thomas
*Attorney, Agent, or Firm*—Oblon, Fisher, Spivak, McClelland & Maier

[57] ABSTRACT

A panel for an elevator used as a car or a door of said elevator comprises a flat front plate; a reinforcing substrate having a waved form which is placed to face one surface of said front plate, wherein central corresponding parts of said reinforcing substrate are bonded to said front plate with a curable binder and peripheral corresponding parts of said reinforcing substrate are fixed through an elastic material to said front plate.

5 Claims, 4 Drawing Figures

PANEL FOR ELEVATOR

This application is a continuation of application Ser. No. 337,507, filed Jan. 6, 1982, now abandoned.

BACKGROUND OF THE INVENTION

1. Field of the Invention

The present invention relates to an improvement of a panel for an elevator used as a car and a door of an elevator.

2. Description of the Prior Art

Referring to FIGS. 1 and 2, a conventional panel for an elevator will be illustrated. In FIG. 1, the reference numeral (1) designates a metallic flat front plate; **(1*a*) designates bond parts; (2) designates a reinforcing substrate having a waved form as a backplate form; (2*a*) designates convex parts facing to the bond parts (1*a*) of the front plate (1) and the reinforcing substrate (2) is prepared by bonding a thin plate such as a tin plate and a galvanized iron plate; and (3) designates a rigid modified acrylate type curable binder which bonds the bond parts (1*a*) and the corresponding parts (2*a*)**.

The conventional panel for an elevator is prepared by bonding the reinforcing substrate (2) to the front plate (1) with the curable binder, whereby an operation for eliminating strain caused by forming the panel for an elevator by welding is not needed, and a broad bond area is given to have superior vibration resistance compared to that of a single plate. The purpose for connecting the reinforcing substrate (2) is to maintain stiffness required for the panel for an elevator. It is not preferable to cause slip relative shift between the bond parts **(1*a*) and the front plate (1) and accordingly, it is necessary to bond them with the curable binder (3), whereby a desirable viscous damping characteristic can not occur at the bond parts (1*a*). That is, the conventional panel for an elevator shown in FIGS. 1 and 2** has an economical structure, but causes an undesirable response of the panel for an elevator to vibration propagated through a rope of an elevator and input caused by passengers' entering a car of the elevator. The sound caused by the response is inferior to that of a panel containing a noise proof material in view of the loud sound. Therefore, the conventional panel is not suitable as a panel for a high quality elevator in view of acoustic characteristic.

SUMMARY OF THE INVENTION

It is an object of the present invention to provide a panel for an elevator which is light weight and economical.

Another object of the present invention is to provide a panel for an elevator which has excellent vibration resistance and results in satisfactory sound reduction over that of a panel containing a noise proof material.

The foregoing and other objects of the present invention have been attained by providing a panel for an elevator used as a car or a door of said elevator which comprises a flat front plate; and a reinforcing substrate having a waved form which is placed to face one surface of said front plate wherein central corresponding parts of said reinforcing substrate are bonded to said front plate with a cured curable binder and peripheral corresponding parts of said reinforcing substrate are fixed through an elastic material to said front plate.

DETAILED DESCRIPTION OF THE PREFERRED EMBODIMENTS

Figure 3:
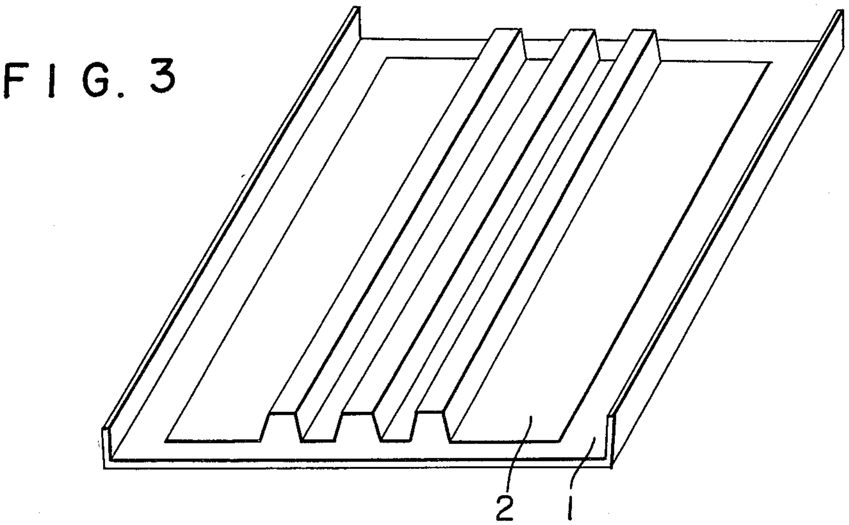
FIG. 3 is a schematic view of one embodiment of a panel for an elevator of the present invention.
Figure 4:
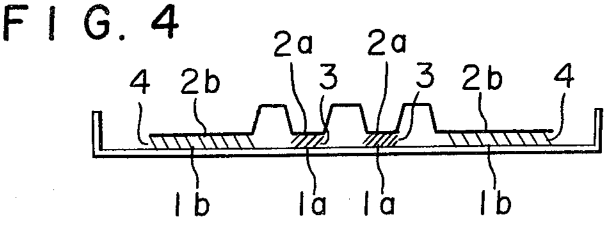
FIG. 4 is an enlarged sectional view of the panel shown in FIG. 3.

Referring to FIGS. 3 and 4, one embodiment of the present invention will be illustrated.

In FIGS. 3 and 4, the same references designate identical or corresponding parts; the reference numeral **(2*a*) designates corresponding parts of the reinforcing substrate (2) facing to the front plate at a central part; (1*a*) designates bond parts of the front plate (1) facing to the central corresponding parts; (2*b*) designates corresponding parts of the reinforcing substrate (2) facing to the front plate (1) at the peripheral flat part of the reinforcing substrate and (1*b*) designates bond parts of the front plate (1) facing to the corresponding parts; (3) designates a cured curable binder for bonding the bond parts (1*a*) of the front plate (1) and the corresponding parts (2*a*) of the reinforcing substrate (2); (4) designates an elastic material as a soft binder such as a rubber type binder for bonding the bond parts (1*b*) of the front plate (1) and the corresponding parts (2*b*) of the reinforcing substrate (2)**.

Figure 1:
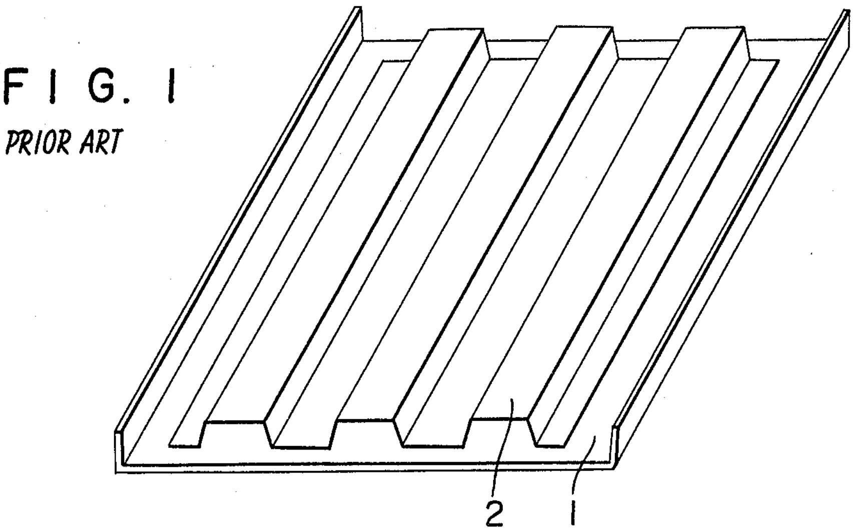
FIG. 1 PRIOR ART
FIG. 1 is a schematic view of a conventional panel for an elevator.
Figure 2:
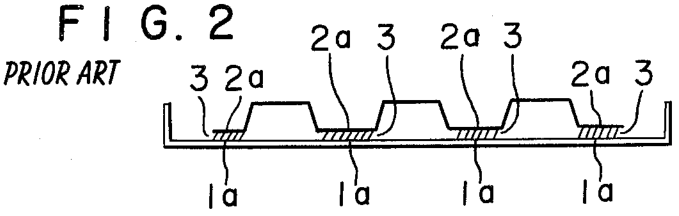
FIG. 2 PRIOR ART
FIG. 2 is an enlarged sectional view of the panel shown in FIG. 1.

That is, the central part of the reinforcing substrate (2) is bonded with the curable binder (3) and the peripheral part of the reinforcing substrate (2) is bonded with an elastic material (4) to the front plate (1). Therefore, the sectional moment of the panel shown in FIG. 4 is substantially the same as that of FIG. 2 to attain bending stiffness similar to that of the panel shown in FIG. 2. Moreover, the vibration energy is absorbed into the elastic material (4) to attain the vibration attenuation since the peripheral parts are bonded with the elastic material (4). Thus, multiple frequency vibration propagated from a hoisting equipment of an elevator through a rope to the panel for an elevator can be reduced. When a passenger enters to a car of an elevator, it causes a local input to cause the multiple frequency vibration for one panel. The vibration-proof effect is attained by the elastic material (4).

The panel for an elevator of the present invention can be easily prepared by simple operation for bonding the front plate (1) and the light weight reinforcing substrate (2) at high productivity and the panel having excellent acoustic characteristic can be obtained.

It is clear that the similar effect is attained by using an elastic sheet such as a rubber plate placed between the corresponding parts **(2*b*) and the front plate (1) instead of the elastic material (4)** in the embodiment.

In accordance with the present invention, the deckplate form reinforcing substrate is bonded to the front plate at the central part with the curable binder and is fixed through the elastic material to the front plate at peripheral part. Thus, the panel can be easily prepared at high productivity to provide the panel for an elevator having suitable stiffness and excellent acoustic characteristic resulted by the vibration attenuation characteristics of the elastic material.

What is claimed as new and desired to be secured by Letters Patent of the United States is:

1. A vibrationally damped reinforced structural panel comprising:

a flat front plate having a first surface;

a corrugated reinforcing substrate, the corrugations of said substrate defining at least three aligned second surfaces, said substrate being positioned adjacent said front plate such that said second surfaces face said first surface;

a rigid cured binder bonding only central ones of said second surfaces to said first surface; and an elastic material bonding only peripheral ones of said surfaces to said first surface, whereby said cured binder provides a fixed bonding between said front plate and substrate while said elastic material provides vibration damping.

2. The panel for an elevator according to claim 1 wherein said elastic material is a soft binder.

3. The panel for an elevator according to claim 2 wherein said soft binder is a rubber type binder.

4. The panel for an elevator according to claim 1 or 2 wherein said cured binder is a modified acrylate type curable binder.

5. The panel for an elevator according to claim 1 or 2 wherein the peripheral part of said front plate has a bent part and said reinforcing substrate faces the bent part of said front plate.

* * * * *